H. A. PALMER.
SEWER-TRAPS.

No. 190,357. Patented May 1, 1877.

Witnesses.
Ira Loughborough
Alfred Tormé

Inventor.
H. A. Palmer
By Thos. Loughborough
Atty.

UNITED STATES PATENT OFFICE.

HORACE A. PALMER, OF ROCHESTER, NEW YORK.

IMPROVEMENT IN SEWER-TRAPS.

Specification forming part of Letters Patent No. 190,357, dated May 1, 1877; application filed April 11, 1877.

*To all whom it may concern:*

Be it known that I, HORACE A. PALMER, of Rochester, in the county of Monroe and State of New York, have invented certain new and useful Improvements in Sewer-Traps; and I do hereby declare that the following is a full, clear, and exact description thereof, reference being had to the accompanying drawing, making part of this specification, in which—

Figure 1:
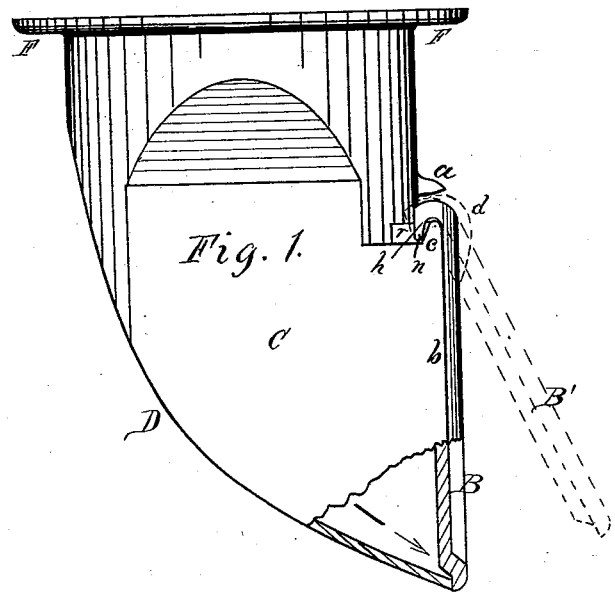
Figure 2:
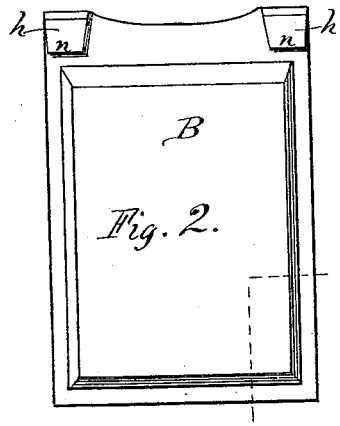

Figure 1 is a side elevation of my improved trap, showing a portion of the lower part of the case, and the edge of the valve broken away. Fig. 2 is a detached view of the valve from within the trap.

The object of this invention is to provide a dry trap for the laterals of street-sewers, &c., which shall be simple in construction, and the valve of which, acting automatically, shall be so sensitive during the first part of its movement, in opening, as to permit the discharge through the trap, at any time, of a very small quantity of water, and at the same time insure its closing perfectly against its vertical seat, immediately after the flow ceases.

Its nature consists in a peculiar method of hanging the valve by an open-hinge hook having a beveled bearing, and the employment of a guard to prevent its being unmounted after the trap is set.

I preferably form the body C of the trap in one casting, especially all those of ordinary size, and with a round top, though they may be made square; or, in either case, of two or more parts. I also prefer a curved back, as shown at D. I provide a vertical seat for the valve B to close against, as shown at *b*; and by flattening the sides of the case from the top of the valve downward, and extending them somewhat beyond the plane of the circumference of the body C, on the valve side, enables me to provide a rectangular opening and seat for the valve to close against.

There is a depression, *r*, formed in each side of the case, having an inclined inner face or wall to the ledge *c*. These recesses or depressions *r* are to receive the hanger-hooks *h*, formed upon the upper corners of the valve inside.

There is a spur or lug, *a*, formed upon the case C, centrally between the depressions *r*, and sufficiently above the upper edge of the valve to permit it to be hung in its proper position when the lower end is resting against its seat, but to prevent the possibility of its being unhooked when swung partially open.

The valve or door B I preferably form, as shown, with a sunken panel, having a V-shaped edge to close inside of the seat *b*. The hinge-hooks *h* should be so formed as to cause their lower edge at *n* to rest snugly against the inclined face of the ledges *c*, very nearly or quite at their base, as shown at Fig. 1. This insures the closing of the upper portion of the valve snugly against its seat; and these edges *n* being the pivotal or axial point or bearing upon which the valve B swings, and they being more or less offset from the inner face of the valve, its gravity causes it to rest snugly against its vertical seat *b*, except when thrown open by the pressure of water deposited upon the curved back D. The hook-hinges *h* may be strengthened by a relay or rib formed upon them, as indicated by the dotted curve *d*.

The valve will swing toward or beyond the position indicated by the dotted lines B', according to the quantity of water requiring passage through the trap.

It will be seen that by means of the web or division between the depressions or recesses *r*, in which the hook-hinges rest, is prevented any lateral or edgewise displacement of the valve B.

Instead of the two hooks, they might be continued from side to side, so as to constitute one lip, and a continuous groove or channel formed or provided for it to rest in, and a spur projecting upward from the upper edge of the door on each side of the guard *a;* or, if desired, a channel cut therein to receive the guard, and it placed lower down upon the case.

What I claim as my invention is—

1. The valve B, provided with the offset hanger-hooks *h*, in combination with the inclined bearing-face of the ledges *c*, substantially as shown and described.

2. In combination with an open-hinged automatically-acting valve for sewer-traps, a guard, *a*, substantially as and for the purposes set forth.

HORACE A. PALMER.

Witnesses:
WM. S. LOUGHBOROUGH,
P. B. HULETT.